(12) United States Patent
Henry (10) Patent No.: US 7,143,157 B2
(45) Date of Patent: Nov. 28, 2006

(54) MANAGING THE NETWORK IMPACT OF A DIGITAL TRANSMITTER

(75) Inventor: Steven G. Henry, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 801 days.

(21) Appl. No.: 10/107,105

(22) Filed: Mar. 25, 2002

(65) Prior Publication Data

US 2003/0182436 A1    Sep. 25, 2003

(51) Int. Cl.
    *G06F 15/173* (2006.01)
(52) U.S. Cl. ..................................... 709/223
(58) Field of Classification Search ............... 109/223, 109/224, 232; 718/101; 709/223, 224, 232, 709/226
    See application file for complete search history.

(56) References Cited

U.S. PATENT DOCUMENTS

| | | | | |
|---|---|---|---|---|
| 5,231,631 A * | 7/1993 | Buhrke et al. | ............... | 370/230 |
| 5,621,775 A * | 4/1997 | Etienne | ............... | 375/372 |
| 6,124,878 A * | 9/2000 | Adams et al. | ............... | 725/118 |
| 6,226,096 B1 * | 5/2001 | Ouchi | ............... | 358/1.14 |
| 6,499,090 B1 * | 12/2002 | Hill et al. | ............... | 711/158 |
| 6,775,729 B1 * | 8/2004 | Matsuo et al. | ............... | 710/263 |
| 6,799,251 B1 * | 9/2004 | Jacobs et al. | ............... | 711/133 |
| 6,842,424 B1 * | 1/2005 | Key et al. | ............... | 370/236 |
| 6,888,840 B1 * | 5/2005 | Ramaswamy et al. | ...... | 370/412 |
| 6,990,071 B1 * | 1/2006 | Adam et al. | ............... | 370/230 |
| 7,032,111 B1 * | 4/2006 | Ruutu et al. | ............... | 713/160 |
| 2002/0048259 A1 * | 4/2002 | Adam et al. | ............... | 370/230 |
| 2002/0091848 A1 * | 7/2002 | Agresta et al. | ............... | 709/231 |
| 2003/0043638 A1 * | 3/2003 | Chrisop et al. | ........ | 365/189.01 |
| 2003/0152105 A1 * | 8/2003 | Arimilli | ............... | 370/468 |

OTHER PUBLICATIONS

John Fitzgibbon, RAMpage, Feb. 15, 2001, Wayback Machine http://web.archive.org/web/20010215024535/http://www.jfitz.com/software/RAMpage/.*

* cited by examiner

*Primary Examiner*—David Wiley
*Assistant Examiner*—J Bret Dennison (57) ABSTRACT

Management of the network impact caused by a digital transmitter, such as a multifunction peripheral (an MFP), delays file transmission until available network bandwidth is sufficient to prevent adverse network impact. In one implementation, a resource determination module determines resource availabilities, including disk space remaining on the digital transmitter and available network bandwidth. A file priority determination module prioritizes files contained in a file library on the digital transmitter for transmission over a network. A store vs. send decision module determines if a highest priority file should be sent over the network, given the resource availabilities.

22 Claims, 4 Drawing Sheets

MANAGING THE NETWORK IMPACT OF A DIGITAL TRANSMITTER

TECHNICAL FIELD

This disclosure relates to managing the network impact of a digital transmitter. In particular, a number of factors are balanced to more efficiently determine the times at which files are transmitted over the network.

BACKGROUND

Digital transmitters such as Hewlett-Packard Company's Digital Senders, multifunction peripherals (MFPs) and digital network copiers frequently transmit large files over networks, such as local area networks (LANs), wide area networks (WANs) and the Internet. Because a large amount of information is contained within documents scanned by the digital transmitter, the resulting files can be quite large. Additionally, because of the increasing use of digital transmitters, the number of such large files generated by such devices is increasing.

Transmission of large digital files generated by digital transmitters and MFPs over the network can present problems related to network bandwidth. In many applications, resource competition with existing network traffic can make it difficult to transmit the large files generated by a digital transmitter in a timely manner.

Similarly, the transmission of large files can slow down other network traffic, some of which may be of higher priority than the files generated by digital transmitters. Particularly where a network is somewhat busy, the transmission of additional large files can greatly increase the time required for the transmission of other files over the network. Accordingly, other users may want to restrict the use of digital transmitters.

SUMMARY

The invention is directed to managing the network impact caused by a digital transmitter, such as a multifunction peripheral (an MFP), by delaying file transmission until available network bandwidth is sufficient to prevent adverse network impact. In one embodiment, a resource determination module determines resource availabilities, including disk space remaining on the digital transmitter and available network bandwidth. A file priority determination module prioritizes files contained in a file library on the digital transmitter for transmission over a network. A store vs. send decision module determines if a highest priority file should be sent over the network, given the resource availabilities.

BRIEF DESCRIPTION OF THE DRAWINGS

The same numbers are used throughout the drawings to reference like features and components.

DETAILED DESCRIPTION

Management of the network impact caused by a digital transmitter, such as a multifunction peripheral (an MFP) or Hewlett-Packard Company's Digital Senders, delays file transmission until available network bandwidth is sufficient to prevent adverse network impact. In one implementation, a resource determination module determines resource availabilities, including disk space remaining on the digital transmitter and available network bandwidth. A file priority determination module prioritizes files contained in a file library on the digital transmitter for transmission over a network. A store vs. send decision module determines if a highest priority file should be sent over the network, given the resource availabilities.

Exemplary Digital Transmitter Architecture

Figure 1:
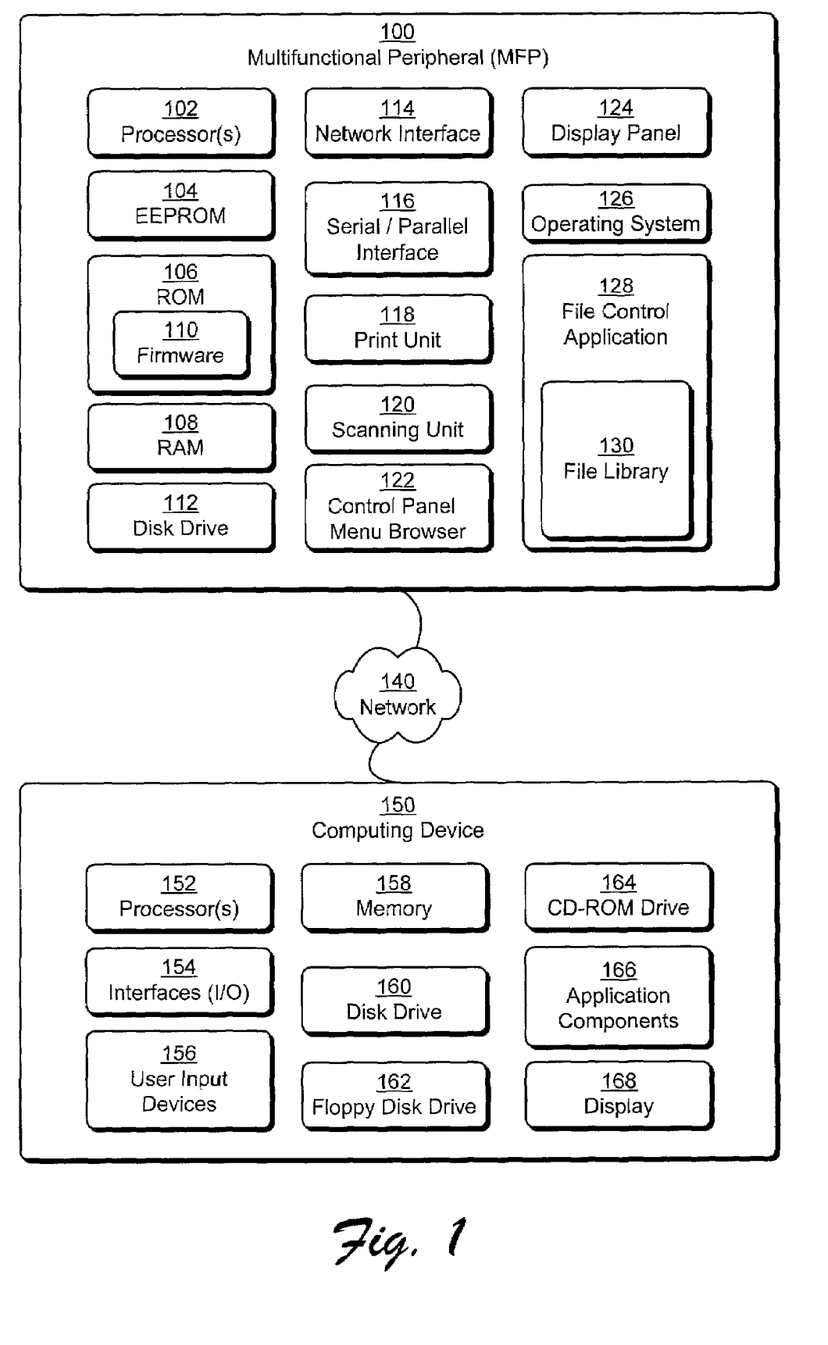
FIG. 1 is block diagram illustrating a digital transmitter exemplified by a multifunction peripheral device in a network environment.

FIG. 1 illustrates a computing device 150 and a digital transmitter, illustrated for purposes of example by a multifunction peripheral (MFP) 100, attached to a network 140. Examples of digital transmitters include MFPs, scanners, network copiers, Hewlett-Packard Company's Digital Senders and other devices that are capable of transmitting information on a network. The MFP 100 is capable of multiple functions which are related to, but not limited to, printing, copying, scanning, text recognition, sending and receiving faxes, print media handling, and/or data communication, either by print media or e-media, such as via email or electronic fax.

Multifunction peripheral device 100 also includes a software or firmware component 110 that can be implemented as a memory module stored on ROM 106 or as code loaded into memory from storage, such as disk drive 112. Firmware 110 is programmed and tested like software, and is distributed with the multifunction peripheral device 100. Firmware 110 can be implemented to coordinate operations of the hardware within multifunction peripheral device 100 and typically contains low-level programming constructs used to perform such operations.

Processor(s) 102 process various instructions to control the operation of multifunction peripheral device 100 and to communicate with other electronic and computing devices. The memory components, EEPROM 104, ROM 106, and RAM 108, store various information and/or data such as configuration information, fonts, templates, print data, scanned image data, and menu structure information. Although not shown, a particular multifunction peripheral device can also include a flash memory device in place of or in addition to EEPROM 104 and ROM 106.

Multifunction peripheral device 100 also includes a disk drive 112, a network interface 114, and a serial and/or parallel interface 116. Disk drive 112 provides additional storage for program code, data being printed, copied, scanned, and/or faxed, or other information maintained by multifunction peripheral device 100. Disk drive 112 may also include storage for executable program code, such as the operating system 126, the file control application 128 or applications running in the file library 130. Although multifunction peripheral device 100 is illustrated having both RAM 108 and a disk drive 112, a particular multifunction peripheral device may include either RAM 108 or disk drive 112, depending on the storage needs of the multifunction peripheral device.

Network interface 114 provides a connection between multifunction peripheral device 100 and a data communication network. Network interface 114 allows devices coupled to a common data communication network to send print jobs, faxes, menu data, and other information to multifunction peripheral device 100 via the network. Similarly, the serial and/or parallel interface 116 provides a data communication path directly between multifunction peripheral device 100 and another electronic or computing device. Although multifunction peripheral device 100 is illustrated having a network interface 114 and serial and/or parallel interface 116, a particular multifunction peripheral device may only include one such interface component.

Multifunction peripheral device 100 also has a print unit 118 that includes mechanisms arranged to selectively apply ink (e.g., liquid ink, toner, etc.) to a print media such as paper, plastic, fabric, and the like in accordance with print data corresponding to a print job. For example, print unit 118 can include a conventional laser printing mechanism that selectively causes toner to be applied to an intermediate surface of a drum or belt. The intermediate surface can then be brought within close proximity of a print media in a manner that causes the toner to be transferred to the print media in a controlled fashion. The toner on the print media can then be more permanently fixed to the print media, for example, by selectively applying thermal energy to the toner.

Print unit 118 can also be configured to support duplex printing, for example, by selectively flipping or turning the print media as required to print on both sides. Those skilled in the art will recognize that there are many different types of print units available, and that for the purposes of the present invention, print unit 118 can include any of these different types.

Multifunction peripheral device 100 also has a scanning unit 120 that can be implemented as an optical scanner to produce machine-readable image data signals that are representative of a scanned image, such as a photograph or a page of printed text. The image data signals produced by scanning unit 120 can be used to reproduce the scanned image on a display device, such as a computer display or a printer.

Multifunction peripheral device 100 also includes a control panel and menu browser 122, and a display panel 124. The control panel and menu browser 122 allows a user of the multifunction peripheral device 100 to navigate the device's menu structure. Control panel 122 can be indicators or a series of buttons, switches, or other selectable controls that are manipulated by a user of the multifunction peripheral device. Display panel 124 is a graphical display that provides information regarding the status of the multifunction peripheral device 100 and the current options available to a user through the menu structure.

Multifunction peripheral device 100 typically provides an operating system 126 that provides a runtime environment within which software applications, data structures or components can exist and operate. Those skilled in the art will recognize that there are many different types of available runtime environments. A runtime environment facilitates the extensibility of multifunction peripheral device 100 supporting the operation of various interfaces, data structures and applications that provide enhanced functionality.

The digital transmitter also provides a file control application 128. As will be seen in greater detail in FIG. 2, the file control application creates files in response to the scanning unit 120 or other input device. A decision is then made to store or send the file; accordingly the file is either deposited in the file library 130 for later transmission, or is transmitted to the server 150 or other location.

General reference is made herein to digital transmitters, which are illustrated by a specific example including a common digital transmitter, the multifunction peripheral device 100. Although specific examples may refer to certain specific devices having particular functionalities, such examples are not meant to limit the scope of the claims or the description, but are meant to provide a specific understanding of the described implementations. Furthermore, it is to be appreciated that the described components are exemplary, and are not intended to limit application of the claimed subject matter to multifunction and reproduction devices that include only these components. For example, other types of digital transmitters, such as network copiers and Hewlett-Packard Company's Digital Senders could be substituted, while still benefiting from the arrangements described herein. Accordingly, other devices having components different from and/or in addition to those described herein can be used in implementing the described techniques and systems.

FIG. 1 additionally illustrates various components of an exemplary server or similar computing device 150 that can be utilized in conjunction with the MFP 100. The computing device and MFP are typically connected by a network 140, which may be a LAN, the Internet, a simple cable or other connective device. Computer 150 includes one or more processors 152, interfaces 154 for inputting and outputting data, and user input devices 156. Processor(s) 152 process various instructions to control the operation of computer 200, while interfaces 154 provide a mechanism for computer 150 to communicate with other electronic and computing devices, such as multifunction peripheral device 100 (FIG. 1). User input devices 156 include a keyboard, mouse, pointing device, and/or other mechanisms for interacting with, and inputting information to computer 150.

Computer 150 also includes a memory 158 (such as ROM and/or RAM), a disk drive 160, a floppy disk drive 162, and a CD-ROM drive 164. Memory 158, disk drive 160, floppy disk drive 162, and CD-ROM drive 164 provide data storage mechanisms for computer 150. Although not shown, a system bus typically connects the various components within the computing device 150.

Computer 150 also includes application components 166 and can include an integrated display device 168, such as for a portable laptop computer, personal digital assistant (PDA), and similar computing devices. Application components 166 provide a runtime environment in which software applications or components can run or execute on processor(s) 152.

Figure 2:
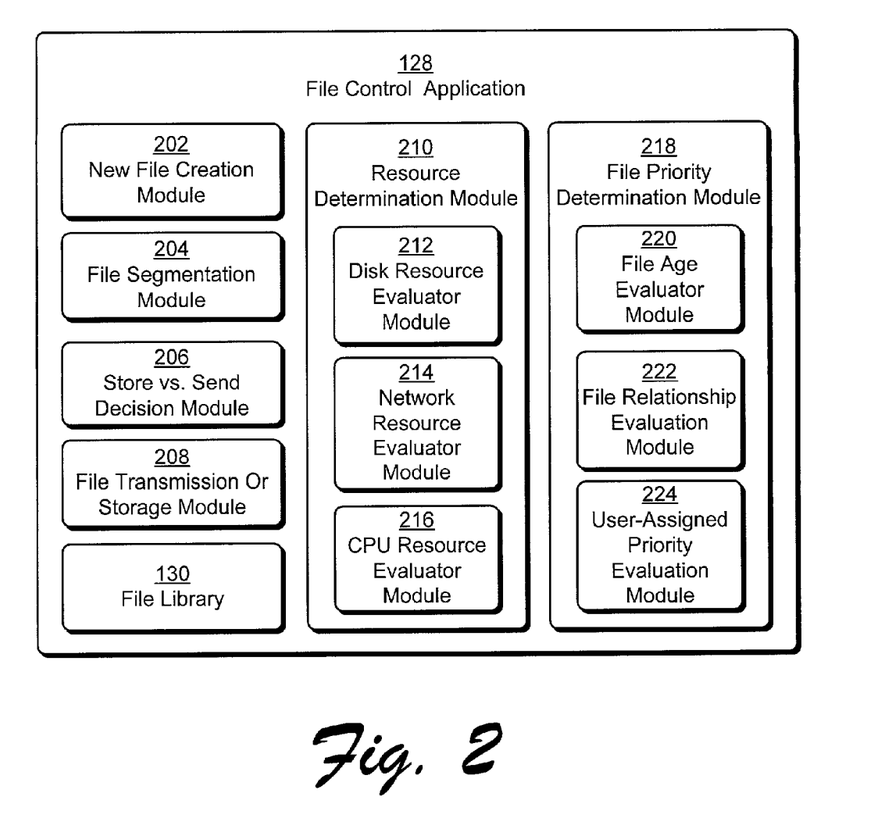
FIG. 2 is block diagram illustrating a detailed view of portions of the multifunction peripheral device of FIG. 1.

FIG. 2 shows a detailed view of an implementation of the file control application 128 first seen in FIG. 1. In one implementation, the file control application includes one or more software, firmware or hardware modules containing processor executable steps which may be executed by one or more processors within a digital transmitter, such as a multifunction peripheral or similar device. Alternatively, the file control application may be located on a server, from where it is able to control file handling on the digital transmitter.

A new file creation module 202 is in communication with the scanning unit 120. Data received from the file creation module is used to create a file, which is formed in any appropriate file format, such as JIF or JPEG.

A file segmentation module 204 may be used to segment the file created by module 202 into a plurality of segments. Transmission of a sequence of file segments over the network tends to have less impact on others using the network, since intervals between successive segments allows a break during which network traffic is reduced. Generally, larger files are segmented, thereby avoiding the transmission of large blocks of data without interruption.

A store vs. send decision module 206 makes the decision to store or send the file or file segments. As will be discussed in greater detail in FIG. 4, the decision to store or send is based upon a balancing of factors including, but not limited to, the level of available network bandwidth, the disk space remaining on which files may be stored and the available CPU resources of the MFP. In general, files are sent during periods when network traffic is lower than a network traffic threshold. As a result, the network is not unduly burdened. When network traffic exceeds the network traffic threshold, files are temporarily stored, until network traffic subsides. However, as disk space remaining decreases, the network traffic threshold may be increased, thereby sending files over the network in spite of greater network traffic, which tends to prevent the disk from becoming overly full.

A file transmission or storage module 208 is in communication with the network interface and the file library 130, allowing files to be transmitted or stored, according to the store vs. send decision module.

A resource determination module 210 determines the resources available, including disk space remaining, available network bandwidth and the CPU resources of the MFP or other digital transmitter.

A disk resource evaluator module 212 determines the disk space remaining on the disk drive of the MFP or other digital transmitter. Where the disk space used exceeds (or performance of a task could cause the disk space used to exceed) a disk space threshold, the disk resource evaluator module may turn off the scanning unit, or provide a warning to the user. By turning off the scanning unit, or by warning the user, the multifunction peripheral or other digital transmitter does not completely run out of disk space while a document is in the process of being scanned and an associated file is being generated.

A network resource evaluator module 214 evaluates the available network bandwidth using conventional means. The means selected should measure the average available network bandwidth over a period of time suitable to prevent an invalid assumption of high network traffic. The network resource evaluator module also obtains information on the disk space remaining from the disk resource evaluator module. Using both pieces of information, the resource determination module 210 determines if a network traffic threshold should be altered to prevent the send vs. store module 206 from sending the highest priority file over the network in view of the disk space remaining and the available network bandwidth.

A CPU resource evaluator module 216 monitors the CPU resources available on the MFP or other digital transmitter. Where the MFP or other digital transmitter is busy with a task, such as scanning a document, the CPU resources evaluator module may report this information to the store vs. send decision module, thereby allowing this information to be used in the store vs. send decision.

A file priority determination module 218 prioritizes files contained in a file library 130 on the MFP or other digital transmitter for transmission over a network. In one implementation, each file's age, relationship to other files (such as if two files are segments of a greater file) and any user-assigned priority may be evaluated in determining each files priority for transmission.

A file age evaluator module 220 evaluates the age of each file in the file library 130, and adjusts an age component of file transmission priority, giving earlier created files greater file transmission priority. Accordingly, files tend to be stored and transmitted in a first-in/first-out manner. However, some modification of this is possible, as seen below.

A file relationship evaluation module 222 increases a relationship component of the file transmission priority of files that have a segmentation relationship to at least one file within the file library. Thus, if a large file is segmented into a plurality of file segments by the file segmentation module 204, the file segments can be given a higher file transmission priority, particularly after one of the file segments has been transmitted. Thus, the file segments will tend to either remain in storage together, or be transmitted in a sequence with few if any other files transmitted between any two file segments.

A user-assigned priority evaluation module 224 allows a user to influence file transmission priority. In particular, the user may assign particularly high or low file transmission priority to the file associated with a given document. Accordingly, the file priority determination module will assign a higher or lower file transmission priority to the file associated with the document than would be assigned if only age and file relationship were considered.

Figure 3:
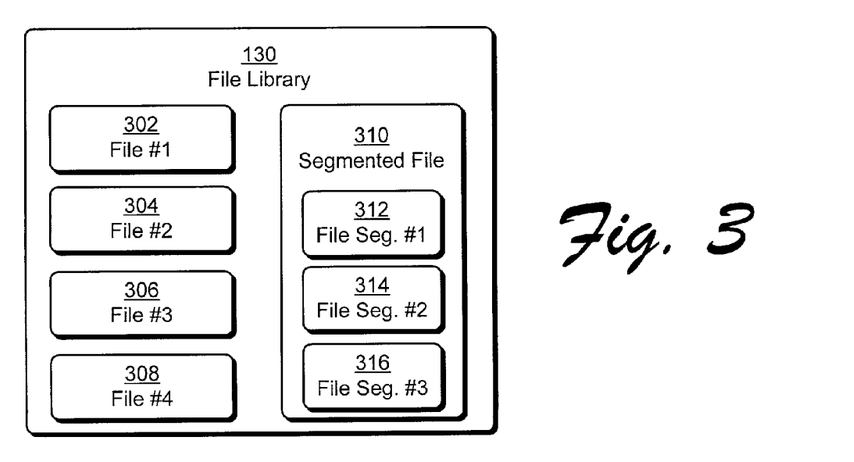
FIG. 3 is a block diagram representing a detailed view of the file library.

FIG. 3 shows greater detail of the file library 130. Four files 302, 304, 306, 308 are associated with four documents, which may have been scanned into a digital transmitter or otherwise acquired. A fifth file 310 is associated with a larger document. Accordingly, the file segmentation module has segmented the file into segments 312, 314, 316.

Figure 4:
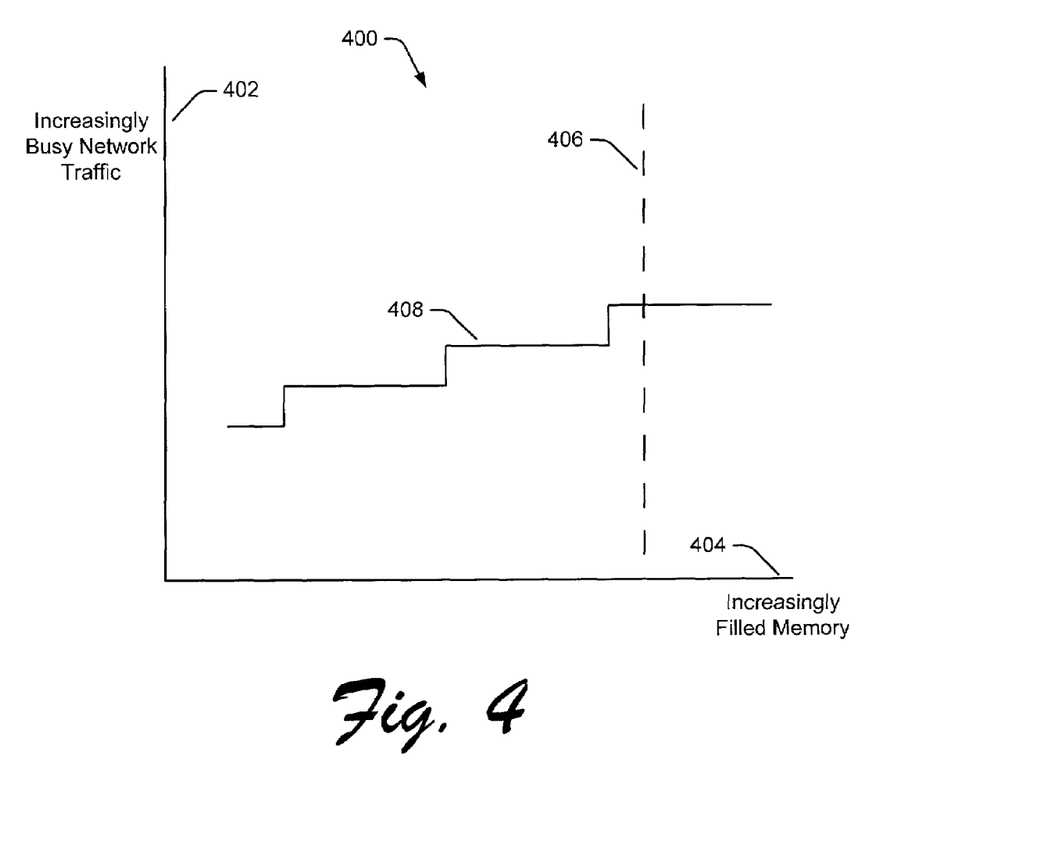
FIG. 4 is a graph that illustrates the relationship between network traffic levels and disk space remaining.

FIG. 4 shows a graph 400 that illustrates the relationship between network traffic levels and disk space remaining. The increasing network traffic is shown on the vertical axis 402 and increasing filled memory storage, e.g. disk-drive capacity, is shown on the horizontal axis 404. The dotted vertical line illustrates the disk space threshold 406, which was established by the disk resource evaluator module or similar software or hardware structure.

As seen above, when the disk space threshold is exceeded, or performance of a scanning operation would result in the disk space threshold being exceeded, the scanning unit may be shut down.

As seen above, the network traffic threshold 408 is set by the network resource evaluator module. The network traffic threshold is a level of network activity. When the threshold level is exceeded by the network traffic, the store vs. send module prevents file transmission.

In general, when the disk space remaining on the MFP or other digital transmitter is higher, the network traffic threshold is set at a lower level. A lower network traffic threshold is more frequently exceeded by network traffic, thereby causing files to be stored rather then transmitted. However, when the disk space remaining on the MFP or other digital transmitter is lower, the network traffic threshold is set at a higher level. A higher network traffic threshold is less frequently exceeded by network traffic, thereby causing files to be transmitted rather then stored.

Figure 5:
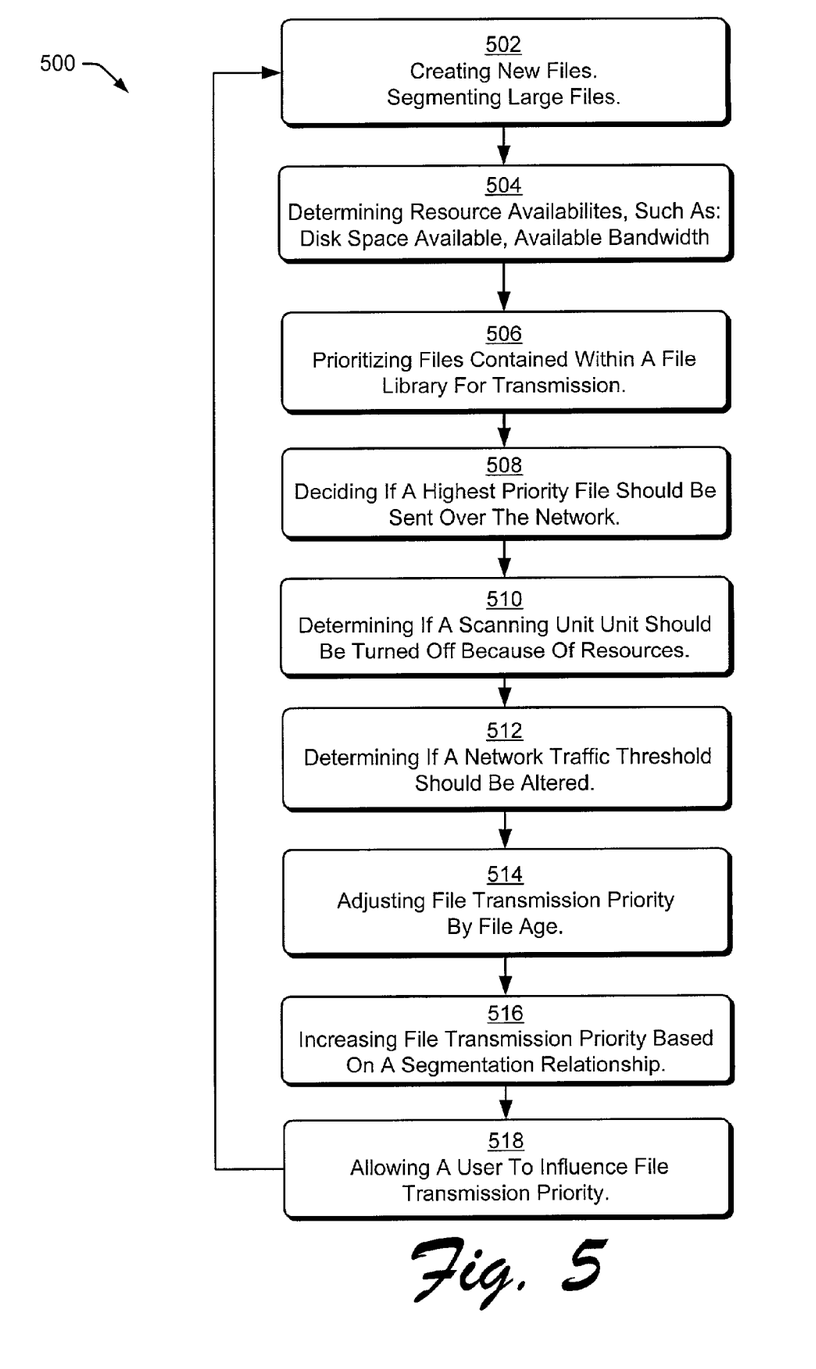
FIG. 5 is a flow diagram that illustrates a method that efficiently manages the network impact of a digital transmitter.

FIG. 5 shows a flow diagram that illustrates a method of efficiently managing the network impact of a digital transmitter such as an MFP or Hewlett-Packard's Digital Sender. In some cases, the transmission of files created when a digital transmitter scans a document is delayed until available network bandwidth is sufficient. The method is repeatedly executed, to update the elements illustrated. An implementation of the method involves determining the resources available, including the disk space remaining on the digital transmitter and available network bandwidth; prioritizing files contained in a file library on the digital transmitter for transmission over a network; and deciding if a highest priority file should be sent over the network, the given resource availabilities.

At block 502, new files are created by the digital transmitter. The files may be created by scanning a document or other means. For example, the new file creation module 202 of FIG. 2 allows data received from a scanning unit to be used in the creation of files of various formats. Where appropriate, the file created is segmented. For example, the file segmentation module 204 of FIG. 2 may be used to segment larger files. File segmentation reduces the transmission of large segments of data without interruption.

At block 504, resource availabilities of the digital transmitter are determined. Such resources can include a measure of the disk space remaining and a measure of the available processing time of the central processing unit (CPU) on the digital transmitter. Additionally, the available bandwidth of the network may be evaluated. These evaluations may be made by the resources priority determination module 210 of FIG. 2 or similar software or hardware module.

At block 506, the files contained within the file library are prioritized for transmission over the network. For example, the file priority determination module 218 of FIG. 2 may be used to prioritize the files for transmission. The prioritization may be made using criteria such as each file's age, relationship to other files (such as if two files are segments of a greater file) and any user-assigned priority. The criteria may be weighted as desired. All files in the library may be prioritized, or one or more particularly high priority files may be identified.

At block 508, it is decided if the highest priority file in the library should be transmitted over the network. For example, the store vs. send decision module 206 of FIG. 2 may be used to make the determination. As seen above, the decision to store or send is based upon a balancing of factors including, but not limited to, the level of available network bandwidth, the disk space remaining on which files may be stored and the available CPU resources of the digital transmitter. The network traffic and disk space thresholds are taken into account. In general, files are sent during periods when network traffic is lower than a network traffic threshold and/or when file volume threatens to exceed the disk space threshold.

At block 510, it is determined if a scanning unit within the digital transmitter should be turned off because the disk space remaining on the digital transmitter is below a disk space threshold. For example, the disk resources evaluator module 212 of FIG. 2 may be used to warn the user, and then to turn off the scanning unit to prevent the digital transmitter from completely running out of disk space while a document is in the process of being scanned and an associated file is being generated.

At block 512, it is determined if a network traffic threshold should be altered to prevent transmission of the highest priority file over the network. For example, the network resource evaluator module 214 of FIG. 2 evaluates available network bandwidth and obtains information on the disk space remaining from the disk resource evaluator module. It then determines if a network traffic threshold should be altered to prevent transmission of the highest priority file over the network in view of the disk space remaining and the available network bandwidth.

At block 514, file transmission priority is adjusted for the age of files, giving earlier created files greater file transmission priority. For example, the file age evaluator module 220 of FIG. 2 may be used to evaluate the age of each file in the file library 130, and adjusts an age component of file transmission priority.

At block 516, the file transmission priority of files that have a segmentation relationship to at least one file in the library is increased. For example, the file relationship evaluation module 222 of FIG. 2 increases a relationship component of the file transmission priority of files that have a segmentation relationship to at least one file within the file library. Due to the increase in priority, related file segments will tend to either remain in storage together, or be transmitted in a sequence with few if any other files transmitted between any two file segments.

At block 518, the user is allowed to influence file transmission priority, particularly including the transmission priority of the user's file. For example, the user-assigned priority evaluation module 224 allows a user to influence file transmission priority. For example, the user may set a high priority if the file must be sent in the near future or a low priority if the time of transmission is not crucial.

In conclusion, a system and method for managing the network impact caused by a digital transmitter delays file transmission until available network bandwidth is sufficient to reduce the network impact of digital transmitters, such as MFPs. In one implementation, a resource determination module determines resource availabilities, including the disk space remaining on the digital transmitter and the available network bandwidth. A file priority determination module prioritizes files contained in a file library on the digital transmitter for transmission over a network. A store vs. send decision module determines if a highest priority file should be sent over the network, given the resource availabilities.

Although the disclosure has been described in language specific to structural features and/or methodological steps, it is to be understood that the appended claims are not limited to the specific features or steps described. Rather, the specific features and steps are exemplary forms of implementing this disclosure. For example, while different software modules have been indicated, the same functionality could be combined into a greater or fewer numbers of modules, as indicated by a specific application.

The invention claimed is:

1. A processor-readable medium comprising processor executable instructions for:
   determining resource availabilities, comprising: disk space remaining and available bandwidth of a network;
   delaying file transmission over the network if resources, including disk space remaining and available bandwidth of the network, are determined to be above a threshold until available bandwidth of the network is sufficient to prevent adverse network impact, wherein as disk space remaining decreases, the network traffic threshold is increased to allow the transmission of files over the network to prevent the disk space from becoming full;
   prioritizing files contained in a file library for transmission over the network;
   sending a highest priority file over the network after file transmission is delayed;
   instructing a scanning unit that converts scanned documents into digital files to turn off if the disk space remaining is less than a disk space threshold; and
   altering the network traffic threshold to prevent transmission of the highest priority file over the network if disk space remaining falls below a predetermined threshold value.

2. A processor-readable medium as recited in claim 1, comprising further instructions for:
adjusting file transmission priority by file age, giving earlier created files greater file transmission priority.

3. A processor-readable medium as recited in claim 2, comprising further instructions for:
increasing the file transmission priority of segmented files that have a segmentation relationship to at least one file within the file library.

4. A processor-readable medium as recited in claim 3, comprising further instructions for:
allowing a user to influence file transmission priority.

5. A processor-readable medium as recited in claim 4, comprising further instructions for:
segmenting files that have file sizes above a threshold value into at least two file segments.

6. A processor-readable medium as recited in claim 1, comprising further instructions for:
altering a network traffic threshold to prevent, in view of the disk space remaining, transmission of the highest priority file over the network.

7. A processor-readable medium as recited in claim 1, comprising further instructions for:
adjusting file transmission priority by file age, giving earlier created files greater file transmission priority.

8. A processor-readable medium as recited in claim 1 comprising further instructions for:
increasing file transmission priority of segmented files that have a segmentation relationship to at least one file within the file library.

9. A processor-readable medium as recited in claim 1 comprising further instructions for:
allowing a user to influence file transmission priority.

10. A processor-readable medium as recited in claim 1, comprising further instructions for:
segmenting files that have file sizes above a threshold value into at least two file segments.

11. A method of managing network impact caused by a digital transmitter comprising:
determining resource availabilities, comprising: disk space remaining and available network bandwidth;
delaying file transmission over the network if resources, including disk space remaining and available network bandwidth, are determined to be above a threshold until available network bandwidth is sufficient to prevent adverse network impact, wherein as disk space remaining decreases, the network traffic threshold is increased to allow the transmission of files over the network to prevent the disk space from becoming full;
prioritizing files contained in a file library on the digital transmitter for transmission over the network;
sending turning off instructions to a scanning unit that converts scanned documents into digital files if the disk space remaining is less than a disk space threshold; and
altering the network traffic threshold to prevent transmission of the highest priority file over the network if disk space remaining falls below a predetermined threshold value.

12. The method of claim 11, additionally comprising:
adjusting file transmission priority by file age, giving earlier created files greater priority.

13. The method of claim 12, additionally comprising:
increasing file transmission priority of segmented files that have a segmentation relationship to at least one file within the file library.

14. The method of claim 13, additionally comprising:
allowing a user to influence file transmission priority.

15. The method of claim 14, additionally comprising:
segmenting a file that has a file size above a threshold value into at least two file segments such that each of the at least two segments will have less impact on the available network bandwidth than the file that has a file size above a predetermined threshold value.

16. The method of claim 11, additionally comprising:
altering a network traffic threshold if the disk space remaining falls below a predetermined threshold value.

17. The method of claim 11, additionally comprising:
altering file transmission priority by file age, giving earlier created files greater priority.

18. The method of claim 11, additionally comprising:
increasing file transmission priority of segmented files that have a segmentation relationship to at least one file within the file library.

19. The method of claim 11, additionally comprising:
allowing a user to influence file transmission priority of a user's file.

20. The method of claim 11, additionally comprising:
segmenting a file that has a file size above a predetermined threshold value into at least two file segments such that each of the at least two segments will have less impact on the available network bandwidth than the file that has a file size above the predetermined threshold value.

21. A digital transmitter, comprising:
a resource determination module to determine resource availabilities, comprising: disk space remaining and available bandwidth of a network;
a file delay module that delays file transmission over the network if resources, including disk space remaining and available bandwidth of the network, are determined to be above a threshold until available bandwidth of the network is sufficient to prevent adverse network impact, wherein as disk space remaining decreases, the network traffic threshold is increased to allow the transmission of files over the network to prevent the disk space from becoming full;
a file priority determination module to prioritize files contained in a file library for transmission over the network;
a store vs. send decision module that sends a highest priority file over the network, given the resource availabilities;
a disk resource evaluator module configured to send turning off instructions to a scanning unit that converts scanned documents into digital files if the disk space remaining is less than a disk space threshold; and
a network resource evaluator module that alters the network traffic threshold to prevent transmission of the highest priority file over the network if disk space remaining falls below a predetermined threshold value.

22. The digital transmitter of claim 21, additionally comprising:
a file age evaluator module to adjust file transmission priority by file age, giving earlier created files greater file transmission priority.

* * * * *

UNITED STATES PATENT AND TRADEMARK OFFICE
CERTIFICATE OF CORRECTION

PATENT NO. : 7,143,157 B2 Page 1 of 1
APPLICATION NO. : 10/107105
DATED : November 28, 2006
INVENTOR(S) : Steven G. Henry It is certified that error appears in the above-identified patent and that said Letters Patent is hereby corrected as shown below:

In column 9, line 26, in Claim 8, delete "claim 1" and insert -- claim 1, --, therefor.

In column 9, line 31, in Claim 9, delete "claim 1" and insert -- claim 1, --, therefor.

In column 9, line 39, in Claim 11, after "transmitter" insert -- , --.

In column 10, line 14, in Claim 17, delete "altering" and insert -- adjusting --, therefor.

Signed and Sealed this

Fourth Day of August, 2009

JOHN DOLL
*Acting Director of the United States Patent and Trademark Office*